US012352220B2

United States Patent
Moorcroft et al.

(10) Patent No.: US 12,352,220 B2
(45) Date of Patent: Jul. 8, 2025

(54) CONTROLLER AND METHOD FOR CONTROLLING OPERATION OF A DIRECT INJECTION INTERNAL COMBUSTION ENGINE

(71) Applicant: JAGUAR LAND ROVER LIMITED, Coventry (GB)

(72) Inventors: Adam Moorcroft, Birmigham (GB); Claudio Cascone, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/564,673

(22) PCT Filed: May 27, 2022

(86) PCT No.: PCT/EP2022/064427
§ 371 (c)(1),
(2) Date: Nov. 28, 2023

(87) PCT Pub. No.: WO2022/248674
PCT Pub. Date: Dec. 1, 2022

(65) Prior Publication Data
US 2024/0254932 A1  Aug. 1, 2024

(30) Foreign Application Priority Data
May 28, 2021 (GB) .................... 2107676

(51) Int. Cl.
*F02D 13/06* (2006.01)
*F01N 3/023* (2006.01)
(Continued)

(52) U.S. Cl.
CPC ............. *F02D 13/06* (2013.01); *F01N 3/023* (2013.01); *F02D 41/0002* (2013.01);
(Continued)

(58) Field of Classification Search
CPC .. F02D 13/0223; F02D 13/06; F02D 41/0002; F02D 41/0005; F02D 41/029;
(Continued)

(56) References Cited

U.S. PATENT DOCUMENTS 10,907,518 B2   2/2021   Heinken et al.
2013/0167508 A1  7/2013  Nishimura
(Continued)

FOREIGN PATENT DOCUMENTS

DE   102013220881 A1   4/2015
DE   102008004059 B4   6/2016
(Continued)

OTHER PUBLICATIONS

Combined Search and Examination Report corresponding to application GB2107676.5, dated Oct. 29, 2021, 6 pages.
(Continued)

*Primary Examiner* — Audrey B. Walter
(74) *Attorney, Agent, or Firm* — TROUTMAN PEPPER LOCKE LLP; Dustin B. Weeks; Nicholas H. Doss

(57) ABSTRACT

A controller, a vehicle incorporating the controller, and a method for controlling operation of a direct injection internal combustion engine having a combustion chamber for performing a plurality of operating cycles. The controller is configured to receive a fuel cut signal indicative of a request to inhibit fuel injection into the combustion chamber and, in dependence on the fuel cut signal, control a fuel supply system to inhibit fuel injection into the combustion chamber to perform one or more fuel cut operating cycle. The controller determines a particulate loading of a particulate filter in an exhaust system. During the one or more fuel cut operating cycle, the controller is configured to control operation of an intake valve to control the introduction of intake (Continued)

gases into the combustion chamber in dependence on the determined particulate loading of the particulate filter.

16 Claims, 7 Drawing Sheets

(51) Int. Cl.
  *F02D 13/02* (2006.01)
  *F02D 41/00* (2006.01)
  *F02D 41/02* (2006.01)
  *F02D 41/12* (2006.01)
(52) U.S. Cl.
  CPC ....... *F02D 41/0005* (2013.01); *F02D 41/029* (2013.01); *F02D 41/123* (2013.01); *F02D 13/0223* (2013.01); *F02D 41/12* (2013.01); *F02D 2200/0812* (2013.01)
(58) Field of Classification Search
  CPC .............. F02D 41/12; F02D 41/123; F02D 2200/0812; F01N 3/023
  See application file for complete search history.

(56) References Cited

U.S. PATENT DOCUMENTS

| 2016/0115878 | A1* | 4/2016 | VanDerWege | ...... F02D 41/0087 123/333 |
| 2019/0292959 | A1* | 9/2019 | Dudar | ................... F01N 13/009 |

FOREIGN PATENT DOCUMENTS

| DE | 102019101139 A1 | 7/2020 |
| DE | 102021100357 A1 | 7/2022 |
| EP | 1536120 A2 | 6/2005 |
| EP | 3495646 A1 | 6/2019 |
| EP | 3599353 A1 | 1/2020 |
| WO | 2020000010 A1 | 1/2020 |

OTHER PUBLICATIONS

Examination Report corresponding to application GB2107676.5, dated Oct. 3, 2023, 3 pages.

International Search Report and Written Opinion corresponding to application PCT/EP2022/064427, dated Sep. 22, 2022, 12 pages.

* cited by examiner

CONTROLLER AND METHOD FOR CONTROLLING OPERATION OF A DIRECT INJECTION INTERNAL COMBUSTION ENGINE

TECHNICAL FIELD

The present disclosure relates to a controller and method for controlling operation of an internal combustion engine. In particular, but not exclusively it relates to a controller and method for controlling operation of an internal combustion engine in a road vehicle, such as a car. Aspects of the invention relate to a controller; to a method; a non-transitory computer-readable medium; and a vehicle.

BACKGROUND

Traditionally 'fuel-cut' is used during engine over-run and shut-down scenarios to save fuel, whilst air continues to pump through the engine and into the exhaust system. The oxygen-rich air passes over a gasoline particulate filter (GPF) disposed in the exhaust system causing the particulates trapped in the GPF (which may be referred to as soot) to burn, thereby regenerating the GPF. However, this has the consequence that the exhaust catalyst may becomes saturated with oxygen, so that it no-longer operates optimally when overrun is ceased and the fuel is reinstated. To overcome this subsequent fuel enrichment is often used to neutralise the catalyst back to stoichiometric operating conditions. Thus, the potential fuel-cut saving possible on drive cycles may be reduced due to the necessity of fuel enrichment on an engine re-start or the fuel reinstatement at the end of overrun.

The Applicant's earlier application GB 1901673.2 discloses a method and apparatus for sequentially cutting the air passing through the engine, via active tappet control (CVVL), followed by cutting the injection (after the last inducted air has received injection). At least in certain embodiments, this control strategy avoids saturating the catalyst with air during fuel cut-off saving. So, stopping the airflow through the engine may reduce or negate the need for catalyst neutralisation enrichment. This may permit an improvement in the realised fuel savings. The contents of GB 1901673.2 are incorporated herein in their entirety by reference.

The incorporation of a GPF in the exhaust system may require a modified control strategy to provide appropriate regeneration.

It is an aim of the present invention to address one or more of the disadvantages associated with the prior art.

SUMMARY OF THE INVENTION

Aspects and embodiments of the invention provide a controller, a vehicle comprising a controller, a method and a non-transitory computer readable medium as claimed in the appended claims.

According to an aspect of the present invention there is provided a controller for controlling operation of a direct injection internal combustion engine having a combustion chamber for performing a plurality of operating cycles, the internal combustion engine being configured to exhaust gases through an exhaust system comprising a particulate filter, the controller being configured to:
receive a fuel cut signal indicative of a request to inhibit fuel injection into the combustion chamber;
in dependence on the fuel cut signal, control a fuel supply system to inhibit fuel injection into the combustion chamber to perform one or more fuel cut operating cycle; and
determine a particulate loading of the particulate filter in the exhaust system;
wherein, during the one or more fuel cut operating cycle, the controller is configured to control operation of an intake valve to control the introduction of intake gases into the combustion chamber in dependence on the determined particulate loading of the particulate filter. By controlling the intake valve, the supply of intake gases to the exhaust system may be controlled during the fuel cut operating cycle. The intake gases typically comprise or consist of air. The intake gases remain un-burnt since combustion is halted during the or each fuel cut operating cycle. The intake gases are oxygen-rich and are pumped into the exhaust system and pass through the particulate filter. The supply of the oxygen-rich gases to the exhaust system may promote or enable regeneration of the particulate filter. At least in certain embodiments, the regeneration of the particulate filter may be controlled by selectively opening and/or closing the intake valve during the fuel cut operating cycle. The particulate filter may comprise or consist of a gasoline particulate filter (GPF).

The regeneration of the particulate filter may occur when the temperature of the particulate filter is sufficiently high. The controller may be configured to monitor a temperature of the particulate filter. The controller may be configured, during the one or more fuel cut operating cycle, to control the intake valve to control the introduction of intake gases into the combustion chamber in dependence on a determined temperature of the particulate filter. The controller may be configured, during the one or more fuel cut operating cycle, to control the intake valve to control the introduction of intake gases into the combustion chamber in dependence on a determination that the temperature of the particulate filter is greater than a predetermined temperature value. The predetermined temperature value may correspond to a temperature which is sufficiently high for regeneration of the particulate filter.

The controller may comprise an electronic processor having an electrical input for receiving said fuel cut signal; and an electronic memory device electrically coupled to the electronic processor and having instructions stored therein. The processor may be configured to access the memory device and execute the instructions stored therein such that it is operable to: control the fuel supply system to inhibit fuel injection into the combustion chamber to perform one or more fuel cut operating cycle; and determine the particulate loading of the particulate filter in the exhaust system. The processor may be configured to control operation of the intake valve to control the introduction of intake gases into the combustion chamber in dependence on the determined particulate loading of the particulate filter. The controller may be configured to control operation of more than one intake valve.

The controller may be configured to compare the determined particulate loading to a predetermined first loading value. The first loading value may correspond to a first particulate loading of the particulate filter. The first loading value may be determined in dependence on empirical data. The first loading value may be an upper loading value.

The controller may be configured, during the one or more fuel cut operating cycle, to open the intake valve to enable the introduction of intake gases into the combustion chamber if the comparison identifies that the determined particulate loading is greater than or equal to the predetermined first loading value. By opening the intake valve, intake gases are drawn into the combustion chamber during a fuel cut operating cycle. Combustion does not occur during the fuel cut operating cycle and the intake gases are expelled to the exhaust system. The expelled intake gases comprise oxygen which is supplied to the particulate filter to promote regeneration. Regeneration of the particulate filter may be performed during the fuel cut operating cycle. Thus, the particulate loading of the particulate filter may be reduced.

The controller may be configured to close the intake valve to inhibit the introduction of intake gases into the combustion chamber during the one or more fuel cut operating cycle if the comparison determines that the determined particulate loading is less than the predetermined first loading value. The first loading value may be a target loading value.

The controller may be configured to compare the determined particulate loading to a predetermined second loading value. The second loading value may correspond to a second particulate loading of the particulate filter. The second loading value may be a lower loading value. The second loading value may be less than the first loading value.

The controller may be configured to monitor the particulate loading of the particulate filter during the one or more fuel cut operating cycle. The controller may be configured to close the intake valve to inhibit the introduction of intake gases into the combustion chamber during the one or more fuel cut operating cycle if the determined particulate loading decreases to less than the predetermined second loading value. By closing the intake valve, intake gases are no longer drawn into the combustion chamber. The introduction of intake gases into the exhaust system is inhibited. The quantity of oxygen available at the particulate filter may be reduced, thereby suppressing or inhibiting regeneration.

The controller may be configured to monitor the particulate loading of the particulate filter during the one or more fuel cut operating cycle. The controller may control the fuel supply system to reinstate fuel injection into the combustion chamber during the one or more fuel cut operating cycle if the determined particulate loading decreases to less than the predetermined second loading value.

The controller may be configured to monitor the particulate loading of the particulate filter during the one or more fuel cut operating cycle. The controller may be configured to open the intake valve to enable the introduction of intake gases into the combustion chamber if the comparison identifies that the determined particulate loading is greater than the predetermined second loading value.

The controller may be configured to control operation of the intake valve to control the introduction of intake gases into the combustion chamber to maintain a target particulate loading of the particulate filter. The target particulate loading may correspond to the particulate filter being part-loaded. A target loading value may be defined corresponding to the target particulate loading. The target loading value may be non-zero. The control may be performed in dependence on the target loading value. The regeneration of the particulate filter may be controlled such that the particulate loading target tends towards the target particulate loading.

The target particulate loading may correspond to one of the first and second loading values described herein. Alternatively, the target particulate loading may be between the first loading value and the second loading value described herein. It has been determined that a partially loaded particulate filter has higher filtration capabilities than a fully clean particulate filter. By maintaining the particulate filter in a partially loaded condition, the effectiveness of the filtration performed by the particulate filter may be improved. The method and apparatus described herein enable the particulate filter to become partially loaded as frequently as practical. The controller and method described herein may create additional opportunities for regeneration by permitting air to pass through the engine on over-run, (but only when the soot load has become high). The control of the regeneration of the particulate filter to maintain a target particulate loading may be patentable independently of the other control strategies described herein.

The regeneration of the particulate filter may be controlled by controlling the supply of intake gases to the engine during a fuel cut operating cycle. The controller may selectively open and close the intake valve to control the introduction of intake gases to the engine. The controller may be configured to control the timing of the valve opening and/or closing to adjust the quantity of air drawn into the engine. For example, the controller may retard opening of the intake valve and/or advance closure of the intake valve to reduce the quantity of air drawn into the engine. Alternatively, or in addition, the controller may control the extent to which the intake valve is open. The controller may thereby control the quantity of intake gases introduced into the combustion chamber during each fuel cut operating cycle. The controller may, for example, control a lift of the intake valve.

The controller may be configured to model the particulate loading of the particulate filter in dependence on one or more operating parameter of the internal combustion engine. Alternatively, or in addition, the controller may be configured to determine the particulate loading of the particulate filter at least one sensor signal. For example, the controller may receive an inlet pressure signal from an inlet pressure sensor; and/or an outlet pressure signal from an outlet pressure sensor.

The controller may be configured to receive an oxygen level signal from an oxygen sensor. The oxygen sensor may be disposed downstream of the particulate filter. The oxygen level signal may provide an indication of the oxygen content of the gases in the exhaust system downstream of the particulate filter. The controller may monitor regeneration of the particulate filter in dependence on the oxygen level signal.

The controller may be configured to compare the determined particulate loading to a predetermined third loading value. The third loading value may correspond to a third particulate loading of the particulate filter. The third loading value may be a minimum loading value. The third loading value may be less than the second loading value.

The engine may be a multi-cylinder engine comprising a plurality of combustion chambers. The controller may be configured to implement the control strategy in respect of one or more of the cylinders. It is envisaged that the controller would implement the control strategy in respect of all of the cylinders.

The controller may be configured to halt the regeneration of the particulate filter by reinstating the fuel supply to a condition with insufficient oxygen for regeneration to continue. This may be performed, for example, to suppress or halt regeneration to maintain a partial loading of the particulate filter.

It will be understood that various techniques may be employed to determine the particulate loading of the particulate filter. The controller may be configured to implement one or more of the following techniques to determine particulate loading of the particulate filter:

(i) measure the back-pressure before the particulate filter;

(ii) measure the delta-pressure across the particulate filter;
(iii) measure the electrical conductivity across the particulate filter;
(iv) measure the rate of temperature increase during regeneration;
(v) gas analysis sensor during regeneration (a rich burn implies high particulate loading);
(vi) measure attenuation of a radio wave signal transmitted through the particulate filter (a transmitter and a receiver are disposed at opposing ends of the particulate filter, the transmitter transmitting a (RF) signal through the particulate filter and the receiver receiving the (attenuated) signal.); and
(vii) modelling of particulate loading and depletion.

At least in certain embodiments the particulate filter is a gasoline particulate filter (GPF).

The direct injection internal combustion engine may comprise a plurality of the combustion chambers, each combustion chamber being suitable for performing a plurality of operating cycles. The or each combustion chamber may be formed by a cylinder in the direct injection internal combustion engine.

According to a further aspect of the present invention there is provided a vehicle powertrain comprising a controller as described herein.

According to a further aspect of the present invention there is provided a vehicle comprising a controller as described herein.

According to a further aspect of the present invention there is provided a method for controlling operation of a direct injection internal combustion engine having a combustion chamber for performing a plurality of operating cycles, the internal combustion engine being configured to exhaust gases through an exhaust system comprising a particulate filter, the method comprising:
 receiving a request to inhibit fuel injection into the combustion chamber;
 in dependence on the request, inhibit fuel injection to perform one or more fuel cut operating cycle; and
 determine a particulate loading of the particulate filter in the exhaust system;
 wherein, during the one or more fuel cut operating cycle, control the introduction of intake gases into the combustion chamber in dependence on the determined particulate loading of the particulate filter.

The method may comprise monitoring a temperature of the particulate filter. The introduction of intake gases into the combustion chamber may be controlled in dependence on the determined temperature of the particulate filter. During the one or more fuel cut operating cycle, the method may comprise controlling the introduction of intake gases into the combustion chamber in dependence on the determined temperature of the particulate filter. During the one or more fuel cut operating cycle, the method may comprise controlling the introduction of intake gases into the combustion chamber in dependence on a determination that the temperature of the particulate filter is greater than a predetermined temperature value. The predetermined temperature value may correspond to a temperature which is sufficiently high for regeneration of the particulate filter.

The method may comprise comparing the determined particulate loading to a predetermined first loading value.

The method may comprise introducing intake gases into the combustion chamber during the one or more fuel cut operating cycle if the comparison identifies that the determined particulate loading is greater than the predetermined first loading value.

The method may comprise inhibiting the introduction of intake gases into the combustion chamber during the one or more fuel cut operating cycle if the comparison determines that the determined particulate loading is less than the predetermined first loading value.

The method may comprise comparing the determined particulate loading to a predetermined second loading value.

The method may comprise monitoring the particulate loading of the particulate filter during the one or more fuel cut operating cycle. The method may comprise inhibiting the introduction of intake gases into the combustion chamber during the one or more fuel cut operating cycle if the determined particulate loading decreases to less than the predetermined second loading value.

The method may comprise monitoring the particulate loading of the particulate filter during the one or more fuel cut operating cycle. The method may comprise reinstating fuel injection into the combustion chamber during the one or more fuel cut operating cycle if the determined particulate loading decreases to less than the predetermined second loading value.

The method may comprise monitoring the particulate loading of the particulate filter during the one or more fuel cut operating cycle. The method may comprise enabling the introduction of intake gases into the combustion chamber if the comparison identifies that the determined particulate loading is greater than the predetermined second loading value.

The method may comprise controlling the introduction of intake gases into the combustion chamber to maintain a target particulate loading of the particulate filter. The target particulate loading may correspond to the particulate filter being part-loaded. The target particulate loading may be between the first and second particulate loadings.

According to a further aspect of the present invention there is provided a non-transitory computer readable medium comprising computer readable instructions that, when executed by a processor, cause performance of a method as described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
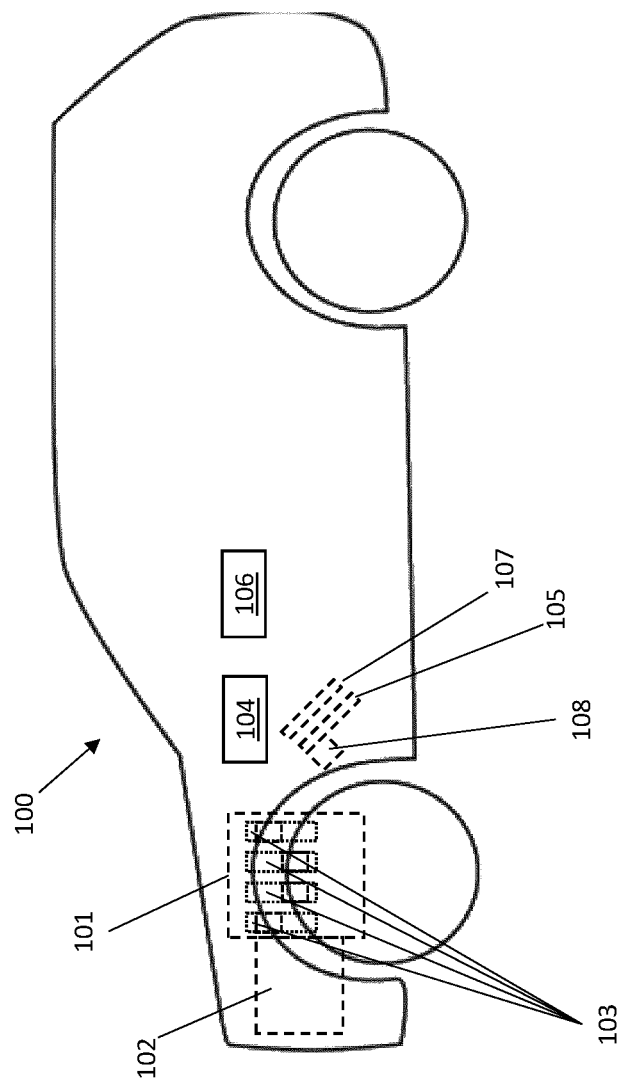
FIG. 1 shows a vehicle embodying a controller in accordance with an embodiment of the present invention.

A vehicle 100, a control system 201, a controller 104, a method 400 and a non-transitory computer readable medium 210 in accordance with an embodiment of the present invention is described herein with reference to the accompanying Figures.

With reference to FIG. 1, the vehicle 100 is a road vehicle in the form of a car. The vehicle 100 comprises an internal combustion engine 101 (referred to below as the engine 101) and a secondary torque source 102 for turning the engine 101 over to start it. The secondary torque source 102, in the present embodiment, is in the form of a belt integrated starter generator 102 configured to rapidly increase the rotational speed of the output of the engine 101 from zero when it is to be restarted.

In the present embodiment the engine 101 is a four stroke petrol (i.e. gasoline) engine comprising four cylinders 103, but it will be appreciated that other embodiments may comprise less than or more than four cylinders. The cylinders 103 form combustion chambers 103A in which fuel is combusted.

The vehicle 100 comprises an accelerator pedal 105, including an accelerator pedal sensor 108, and a brake pedal 107 to enable a user to control the speed of the vehicle 100.

The vehicle 100 also comprises a controller 104 in the form of an engine control unit (ECU) configured to control operation of the engine 101. Amongst other things, the controller 104 is arranged to control fuel injection into the cylinders 103 of the engine 101 in response to signals received from various components of the vehicle 100 including the accelerator pedal sensor 108 and a vehicle supervisory system 106 that is configured to receive user inputs indicative of user requests to switch on the vehicle 100 or switch off the vehicle 100. The supervisory system 106 may comprise a user operable switch and a smart key detection means, or an ignition key switch, or other means of enabling a user to provide indications that the engine 101 is to be started or stopped. A torque controller may function as a supervisory system.

Figure 2:
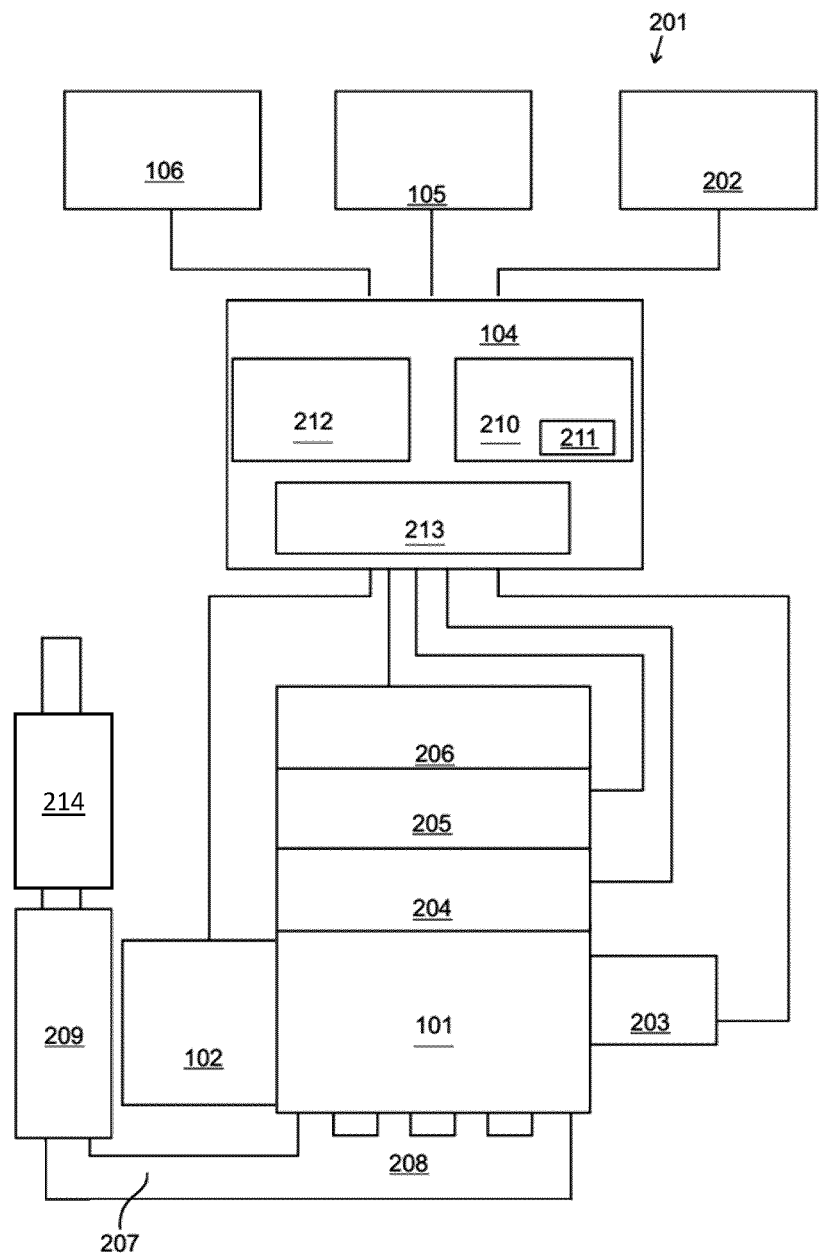
FIG. 2 shows a control system comprising a controller arranged to control operation of an engine of the vehicle.

The controller 104 forms a part of a control system 201, shown schematically in FIG. 2, which is arranged to control operation of the engine 101. As well as receiving input signals from the supervisory system 106 and the accelerator pedal sensor 108, the controller 104 is also arranged to receive input signals from a brake system 202 of the vehicle 100 indicative of user request that are input at the brake pedal 107 (shown in FIG. 1). It also receives input signals from a sensing device 203 arranged to sense the position of the crankshaft (not shown) of the engine 101. In the present embodiment the sensing device 203 comprises a pair of Hall Effect sensors that are positioned to detect the orientation of the flywheel (not shown) of the engine 101.

In response to received input signals, the controller 104 is configured to provide output signals to various components of the control system 201 that control operation of the engine 101, including: fuel injectors 204 for controlling the mass of fuel injected into the cylinders 103 of the engine 101; an ignition system 205 for igniting a fuel and air mixture within the cylinders 103; and a valve actuation means 206 for actuating intake valves (301 shown in FIG. 3) of the cylinders 103 of the engine 101. In the present embodiment the valve actuation means 206 is a continuous variable valve lift (CVVL) system 206, but in alternative embodiments the valve actuation means 206 may comprise a discrete variable valve lift system. However, in either case, in dependence on signals received from the controller 104, the valve actuation means 206 is capable of opening intake valves of the cylinders 103 during respective intake strokes but also capable of continuously maintaining the intake valves of the cylinders 103 in a closed position while the engine 101 is rotated through two or more revolutions.

During its operation, exhaust gases are emitted from the engine 101 via an exhaust system 207. The exhaust system 207 comprises an exhaust manifold 208 and at least one three-way catalytic converter 209. The exhaust system 207 also comprises a particulate filter 214 for reducing particle emissions. The particulate filter 214 is a gasoline particulate filter (GPF) in the present embodiment. The GPF 214 may, for example, comprise a wall-flow substrate for trapping particulates present in the exhaust gases following the combustion process in the engine 101. The GPF 214 is regenerated periodically to remove the trapped particulates, referred to herein as soot. The regeneration of the GPF 214 may be a passive regeneration or an active regeneration. Regeneration occurs when the particulate filter possesses a loading of particulates providing there is oxygen gas present and providing that the filter is sufficiently hot (typically a temperature greater than or equal to 600 degrees centigrade). It will be understood that the exhaust system 207 may comprise a plurality of the catalytic converters 209. Moreover, the GPF 214 may also function as a catalytic converter (often called an 'active' GPF).

During normal operation of the engine 101, when it is producing combustion torque, the controller 104 is configured to provide output signals to the fuel injectors 204, the ignition system 205 and the valve actuation means 206 to cause intake of air into the cylinders 103, injection of fuel into the cylinders 103 and ignition of the fuel at specific times within the four stroke combustion cycle of the cylinders 103. The engine 101 is a direct injection internal combustion engine 101 and therefore, typically, for each cylinder 103, the intake valve (or the intake valves, in embodiments where there are several) are opened and closed during an intake stroke, and fuel is injected into the cylinder 103 during the intake stroke so that the injected fuel is mixed with air drawn in past the open intake valves. The ignition system 205 then ignites the fuel and air mixture towards the end of a compression stroke so that the mixture burns during the following power stroke. The combustion products are then exhausted from the engine 101 in the following exhaust stroke before the cycle begins again with a further intake stroke. The timing of the fuel injection, ignition and operation of the intake valve (opening and/or closing) are scheduled by the controller 104 in dependence on timing signals received from the sensing device 203.

If the engine 101 is not running and a signal is received indicating that the engine 101 is required to produce combustion torque, the controller 104 may provide an output signal to the secondary torque means 102 to cause it to turn the engine 101 over and provide signals to the valve actuation means 206, the fuel injectors 204 and ignition system 205 to cause the engine 101 to be started.

If the engine 101 is running, and a fuel cut signal is received indicating that fuel provided to the engine 101 is to be stopped, the controller 104 co-ordinates stopping of fuel supply to the engine 101 and stopping of ignition of the air-fuel mixture so that the engine 101 stops producing combustion torque. In addition, as will be described in further detail below, the controller 104 also co-ordinates closing of the intake valves of the engine 101 to prevent oxygen reaching the three-way catalytic converter and causing oxidation of the catalyst.

In the present embodiment, the controller 104 is configured to stop and start the engine 101 in accordance with requirements for torque to be produced by the engine. Thus, a fuel cut signal received at the controller 104 could be received from a supervisory system 106 which has received a user input indicating that the engine 101 is to be switched off, but alternatively, the fuel cut signal may be received from the accelerator pedal sensor 108 indicating that the user has released the accelerator pedal 105 and no torque is required to be produced by the engine 101, or alternatively the fuel cut signal may be received by the controller 104 from the brake system 202, which has received a user input at the brake pedal 107 indicating that the vehicle 100 is to slow down, or alternatively the fuel cut signal may be received by the controller 104 from another device or system such as a vehicle supervisory controller (VSC), an advanced driver-assistance system (ADAS), or a similar supervising or arbitrating controller such as a torque controller.

Similarly, when the engine 101 is not producing torque, the controller 104 is configured to cause reinstatement of fuel supply to the engine 101 in dependence on receiving a request signal indicating that positive engine torque is required. For example, the request signal may be generated by the accelerator pedal sensor 108, following a period in which the engine 101 has not been running at all, or at a time when the engine is still turning over due to momentum after it has previously been run.

In the present embodiment, the controller 104 comprises a memory device 210, which stores instructions 211, and a processor 212 configured to access the memory device 210 and execute the stored instructions 211 so that the processor 212 is operable to control the secondary torque source 102, the valve actuation means 206, the ignition system 205 and the fuel injectors 204. The controller 104 also comprises an input/output means 213 of the controller 104 to receive input signals from, and provide output signals to, other components of the vehicle 100. The input/output means 213 may include a transceiver for providing data communication over a data bus, such as a CAN (controller area network) bus.

Figure 3:
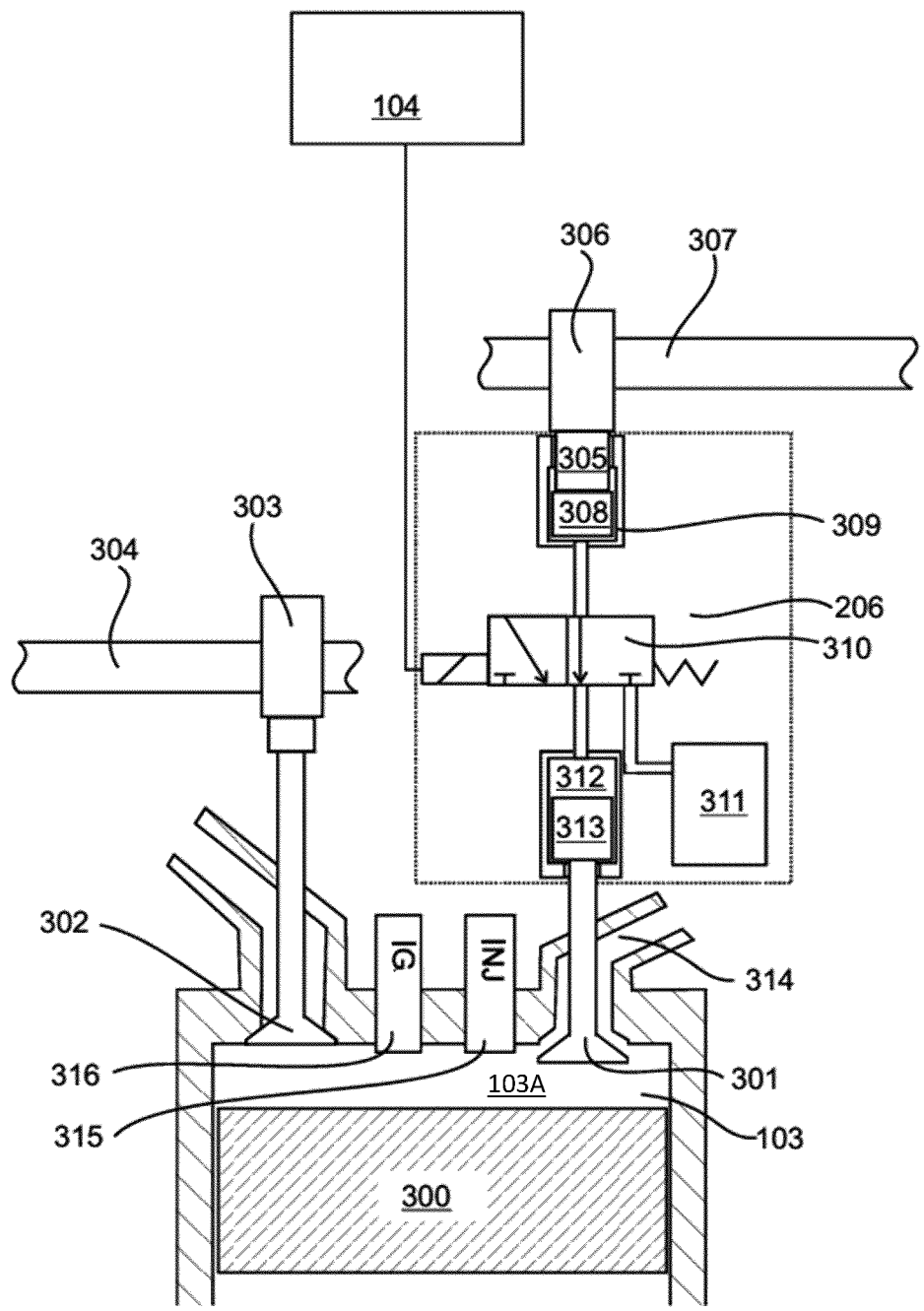
FIG. 3 shows details of a valve actuation means of the control system.

Further details of the valve actuation means 206 of the system 201 is illustrated in FIG. 3, which shows one of the cylinders 103 of the engine 101 containing a piston 300. FIG. 3 also shows the mechanisms by which an intake valve 301 and an exhaust valve 302 of the cylinder 103 are actuated. It should be understood that although only one cylinder 103 with one intake valve 301 is illustrated in FIG. 3, the intake valves 301 of the other cylinders 103 may be actuated in a similar manner. Also, in other embodiments, each cylinder 103 may have more than one intake valve 301 and where the present specification refers to the operation of the intake valve of a cylinder, it also applies to the operation of all of the intake valves of a cylinder that has multiple intake valves. A reference to an intake valve 301 of a cylinder 103 being open, opening, being closed or closing, should be understood to be a reference to all of the intake valves 301 of a cylinder 103 being open, opening, being closed or closing in respect of an embodiment with multiple intake valves 301 for each cylinder 103.

In the present embodiment, the valve actuation means 206 comprises a hydraulic system of a known type which is arranged to actuate only the intake valves 301 of the engine 101. The exhaust valves 302 are actuated by direct mechanical interaction with a cam 303 on a camshaft 304, but in an alternative embodiment, the exhaust valves 302 may also be actuated by a continuous variable valve lift (CVVL) system in a similar manner to the intake valves 301.

The valve actuation means 206 comprises a cam follower 305 which is arranged to be actuated by a cam 306 located on a camshaft 307 of the engine 101. When actuated, the cam follower 305 actuates a piston 308 in a master cylinder 309 of the hydraulic system. The master cylinder 309 is hydraulically connectable via a solenoid valve 310 to a reservoir means 311 and a slave cylinder 312, which contains a piston 313. In the present embodiment, the solenoid valve 310 is biased so that connection is normally provided between the master cylinder 309 and the slave cylinder 312, while the reservoir means 311 is isolated from the master cylinder 309, and when the solenoid valve 310 is actuated, in response to a signal from the controller 104, the master cylinder 309 is connected to the reservoir means 311 and isolated from the slave cylinder 312.

The piston 313 of the slave cylinder 312 is arranged to actuate the intake valve 301. When the intake valve 301 is actuated, as illustrated in FIG. 3, the intake valve 301 is displaced from an intake port 314 of the cylinder 103 to allow air to be drawn into the cylinder 103.

During normal operation of the engine 101, the solenoid valve 310 provides connection between the master cylinder 309 and the slave cylinder 312, at least for a part of the period in which the cam 306 actuates the piston 308 of the master cylinder 309, during the intake stroke of the piston 300. Consequently, the piston 313 of the slave cylinder 312 is hydraulically actuated and pushes the intake valve 301 to an open position, as shown in FIG. 3. As the cam 306 is further rotated, it releases its pressure applied to the piston 308, allowing hydraulic fluid to return to the master cylinder 309, and the intake valve 301 to return to a closed position in which it closes the intake port 314.

However, in response to a signal from the controller 104, the solenoid valve 310 may be moved to connect the master cylinder 309 to the reservoir means 311 during the whole of the intake stroke of the piston 300, so that actuation of the piston 308 in the master cylinder 309 cannot cause actuation of the piston 313 in the slave cylinder 312. Consequently the intake valve 301 remains in the closed position, so that no air is able to enter the cylinder 103 through the intake port 314 during the whole of the intake stroke.

As illustrated in FIG. 3, a fuel injector 315 is positioned to provide an injection of fuel directly into the cylinder 103, and an ignition device 316, such as a spark plug, is provided to ignite fuel and air mixtures present within the cylinder 103.

In alternative embodiments, the valve actuation means 206 may comprise another type of variable valve lift system, such as an electrical system comprising solenoids or electric motors that are arranged to actuate the intake valves 301 of the engine 101 directly.

Figure 4:
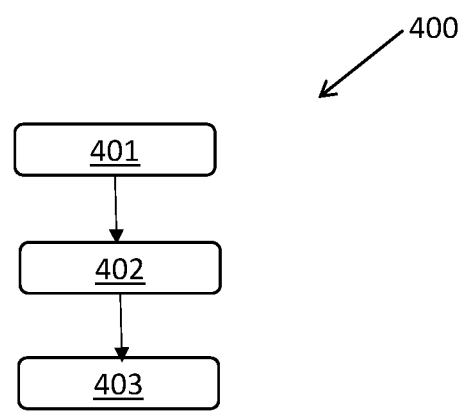
FIG. 4 shows a first flowchart illustrating a method of controlling an internal combustion engine.

A flowchart illustrating a method 400 of controlling an internal combustion engine 101 performable by the controller 104 is shown in FIG. 4. At block 401 a first request signal is received that is indicative of a request to cut fuel to the internal combustion engine 101. For example, the request signal may be received by the controller 104 from a supervisory system 106, which has generated the signal in response to receiving a user input indicating that the engine should be stopped, or the signal may be received from the brake system 202 indicating that the user of the vehicle 100 has applied pressure to the brake pedal 107 indicating that positive engine torque is not currently required. Alternatively, or in addition, the supervisory system 106 may generate the first request signal in dependence on a reduction in the requested torque output of the engine 101 when the vehicle is in motion. The reduction in the torque output may be received following a driver of a vehicle releasing an accelerator pedal or lifting an accelerator pedal. The requested torque output may, for example, be zero or negative. As the vehicle is in motion, the engine 101 enters an overrun state and, if connected to the driveline, may then provide negative or braking torque to the driveline via an engine braking effect.

At block 402 of the method 400, an intake valve 301 of a cylinder 103 of the internal combustion engine 101 is caused to remain closed for the current revolution of the internal combustion engine and revolutions of the internal combustion engine immediately following the current revolution of the internal combustion engine in dependence on the intake valve being closed at the time of receiving the first request signal. In the embodiment of FIG. 3, unless it is activated, the solenoid valve 310 is configured to provide hydraulic connection between the master cylinder 309 and the slave cylinder 312. Consequently, the process of block 402 may be achieved by providing a signal to the solenoid valve 310 to cause it to isolate the slave cylinder 312 from the master cylinder 309 and provide a hydraulic connection between the master cylinder 309 and the reservoir means 311.

In an alternative embodiment, in which the solenoid valve 310 is configured to provide connection between the master cylinder 309 and the reservoir means 311 unless the solenoid valve 310 is activated, the process of block 402 may be achieved by the controller 104 not providing a signal to the solenoid valve 310 that would cause it to connect the master cylinder 309 to the slave cylinder 312 during the intake stroke of the piston 300.

The GPF 214 is regenerated periodically to remove the trapped particulates, typically referred to as soot. The regeneration of the GPF 214 may be a passive regeneration or an active regeneration.

The controller 104 is configured to monitor a particulate (soot) loading of the GPF 214 (referred to herein as the 'GPF particulate loading'). The GPF particulate loading may, for example, be indicated as a proportion (for example, a percentage) of the maximum loading capacity of the GPF 214. In the present embodiment, the controller 104 is configured to model the GPF particulate loading in dependence on the operating conditions of the engine 101. The controller 104 may determine the GPF particulate loading by modelling soot production in dependence on the operating parameters of the engine 101. The production of soot by the engine 101 may be modelled in dependence on empirical data. The controller 104 may integrate soot production with respect to time to estimate a current loading. As described herein, the GPF 214 is regenerated periodically to reduce the GPF particulate loading. The determination of the loading of the GPF 214 may also take into account regeneration of the GPF 214 (passive regeneration and/or active regeneration). The GPF particulate loading is modelled during regeneration, for example in dependence on a measurement of the oxygen content of the exhaust gases downstream of the GPF 214 during or after regeneration. The exhaust system 207 may comprise an oxygen sensor, such as a Heated Exhaust Gas Oxygen Sensor, to monitor oxygen levels.

In a variant, the controller 104 may determine the GPF particulate loading in dependence on the output of one or more sensor. For example, one or more pressure sensor may be provided to measure the pressure of the exhaust gas in the exhaust system 207 at an inlet and/or an outlet of the GPF 214. A pressure differential across the GPF 214 may be determined in dependence on the inlet pressure and the outlet pressure measured by inlet and outlet pressure sensors respectively. The loading of the GPF 214 is directly proportional to the pressure differential across the GPF 214. A large pressure differential is indicative of a high loading of the GPF 214; and a low pressure differential is indicative of a low loading of the GPF 213. The GPF particulate loading may be determined in dependence on the determined pressure differential across the GPF 214. In a variant. the inlet pressure and/or the outlet pressure of the GPF 214 could be modelled. For example, the inlet pressure could be modelled in dependence on one or more operating parameters of the engine 101. Alternatively, or in addition, the inlet pressure and/or the outlet pressure may be modelled in dependence on pressure measurements upstream or downstream of the GPF 214, for example before or after other aftertreatment systems in the exhaust system 207.

The controller 104 is configured to control operation of the engine 101 in dependence on the GPF particulate loading. The controller 104 is configured to monitor the GPF particulate loading to determine when the GPF particulate loading is less than a first loading value; and/or greater than a second loading value. The first loading value and the second loading value are different from each other and define a target load range for the GPF 214. The first loading value and the second loading value correspond to respective upper and lower particulate loadings for the GPF 214. The first loading value in the present embodiment corresponds to the maximum load capacity of the GPF 214. In a variant, the first loading value may be less than the maximum load capacity of the GPF 214. The second loading value is greater than zero. It has been determined that the GPF 214 may be better at filtering particles from the exhaust gases under partial load conditions than under zero load conditions. It is believed that this may be a result of the particulates trapped in the GPF 214 performing additional filtration of the exhaust gases and trapping further particles. The controller 104 may optionally define a third loading value for the GPF particulate loading. The third loading value is greater than zero and less than the second loading value. particulate loading of the corresponding to a minimum particulate loading of the GPF 214. The loading values in the present embodiment are predefined. The first, second and third loading values may, for example, be determined with reference to empirical data.

The controller 104 is configured to control operation of the engine 101 to promote or enable regeneration of the GPF 214 when the determined GPF particulate loading is greater than the first loading value. The controller 104 is configured to control operation of the engine 101 to suppress or inhibit regeneration of the GPF 214 when the determined GPF particulate loading is less than the second loading value. At least in certain embodiments, the controller 104 is configured to provide additional control functions when the determined GPF particulate loading is less than or equal to the third loading value. The operation of the controller 104 to control regeneration of the GPF 214 will now be described in greater detail.

As outlined above, the first request signal is received that is indicative of a request to cut fuel to the internal combustion engine 101. In dependence on the first request signal, the controller 104 co-ordinates stopping of fuel supply to the engine 101 and stopping of ignition of the air-fuel mixture. It has been determined that there may be an opportunity at least partially to regenerate the GPF 214 while the supply of fuel to the engine 101 is stopped. The controller 104 in the present embodiment is configured also to control the opening and/or closing of the intake valves 301 to control the intake of air into the engine 101. By controlling the operation of the intake valves, the controller 104 controls the supply of oxygen through the exhaust system 207, thereby controls regeneration of the soot trapped in the GPF 214, providing the GPF 214 is sufficiently hot to commence regeneration. The controller 104 can open the intake valves 301 to increase the supply of oxygen to the GPF 214, thereby promoting regeneration. The controller 104 can close the intake valves 301 to decrease the supply of oxygen to the GPF 214. The reduced supply of oxygen to the GPF 214 may slow or suppress regeneration of the GPF 214.

The first request signal may be generated when the engine 101 enters an overrun state. The first request signal in this scenario is an overrun request signal. The operation of the controller 104 in this application will now be described. In dependence on receipt of the first request signal, the controller 104 is configured to determine the GPF particulate loading using one or more of the techniques described herein. The controller 104 compares the determined GPF particulate loading to the first and second loading values. If the GPF particulate loading is determined to be greater than the first loading value, the controller 104 is configured to perform a fuel cut to stop the introduction of fuel during the next operating cycle. The controller 104 also controls the ignition system 205 to inhibit ignition during the following power stroke. In dependence on the determination that the GPF particulate loading is greater than the first loading value, the controller 104 opens the intake valves 301 to supply air to the engine 101. The controller 104 may optionally also make a determination of the temperature of the GPF 214. The controller 104 may be configured to open the intake valves 301 to supply air to the engine 101 if the determined temperature of the GPF 214 is greater than a temperature value sufficient for regeneration to occur. The temperature of the GPF 214 may be measured or may be modelled, for example in dependence on one or more operating conditions. As combustion is inhibited, the air expelled from the engine 101 to the exhaust system 207 has a relatively high oxygen content. The oxygen is supplied to the GPF 214 and promotes regeneration. While the engine 101 remains in the overrun state, the controller 104 may determine the GPF particulate loading to identify changes while regeneration is ongoing. The reductions in the GPF particulate loading may, for example, be modelled for regeneration while the engine 101 is in the overrun state and the supply of fuel is cut. The controller 104 may monitor the determined GPF particulate loading with respect to the second loading value. The controller 104 maintains the intake valve 104 open during the overrun state when the determined GPF particulate loading is greater than the second loading value. The controller 104 closes the intake valve 104 when the determined GPF particulate loading is less than the second loading value. The supply of oxygen to the exhaust system 207 is thereby reduced and regeneration of the GPF 214 is suppressed or inhibited. The engine 101 continues to operate in the overrun state with the intake valves 301 closed and fuel cut such that fuel is not injected. The controller 104 is configured to maintain this operating mode until a second request signal is received to reinstate the supply of fuel to the engine 101 and to exit the overrun state. The second request signal may, for example, be generated in dependence on a positive torque request to control the engine 101 to generate a positive torque.

In the above scenario, the controller 104 is configured to close the intake valves 301 when the determined GPF particulate loading is less than the second loading value. The oxygen available in the exhaust system 207 may be sufficient to sustain regeneration after the intake valves 301 are closed. The regeneration of the GPF 214 may be monitored by an oxygen sensor, such as a Heated Exhaust Gas Oxygen (HUGO) sensor. This may enable regeneration of the GPF 214 to continue after the intake valve 301 is closed. The ongoing regeneration may, for example, be identified by monitoring the temperature of the GPF 214. The controller 104 continues to model the GPF particulate loading. The controller 104 may revise the model to reflect a reduced rate of regeneration caused by a reduction in the available oxygen in the GPF 214; and/or a reduced soot production caused by the fuel cut. The controller 104 monitors the determined GPF particulate loading with respect to the third loading value. If the controller 104 determines that the GPF particulate loading decreases to a value less than or equal to the third loading value, the controller 104 is configured to cause reinstatement of the fuel supply to the engine 101. The controller 104 may be configured to maintain the intake valves 301 in the closed position and continue operation of the engine 101 in the overrun state. Alternatively, the controller 104 may be configured also to open the intake valves 301, thereby ending the overrun state.

Figure 5:
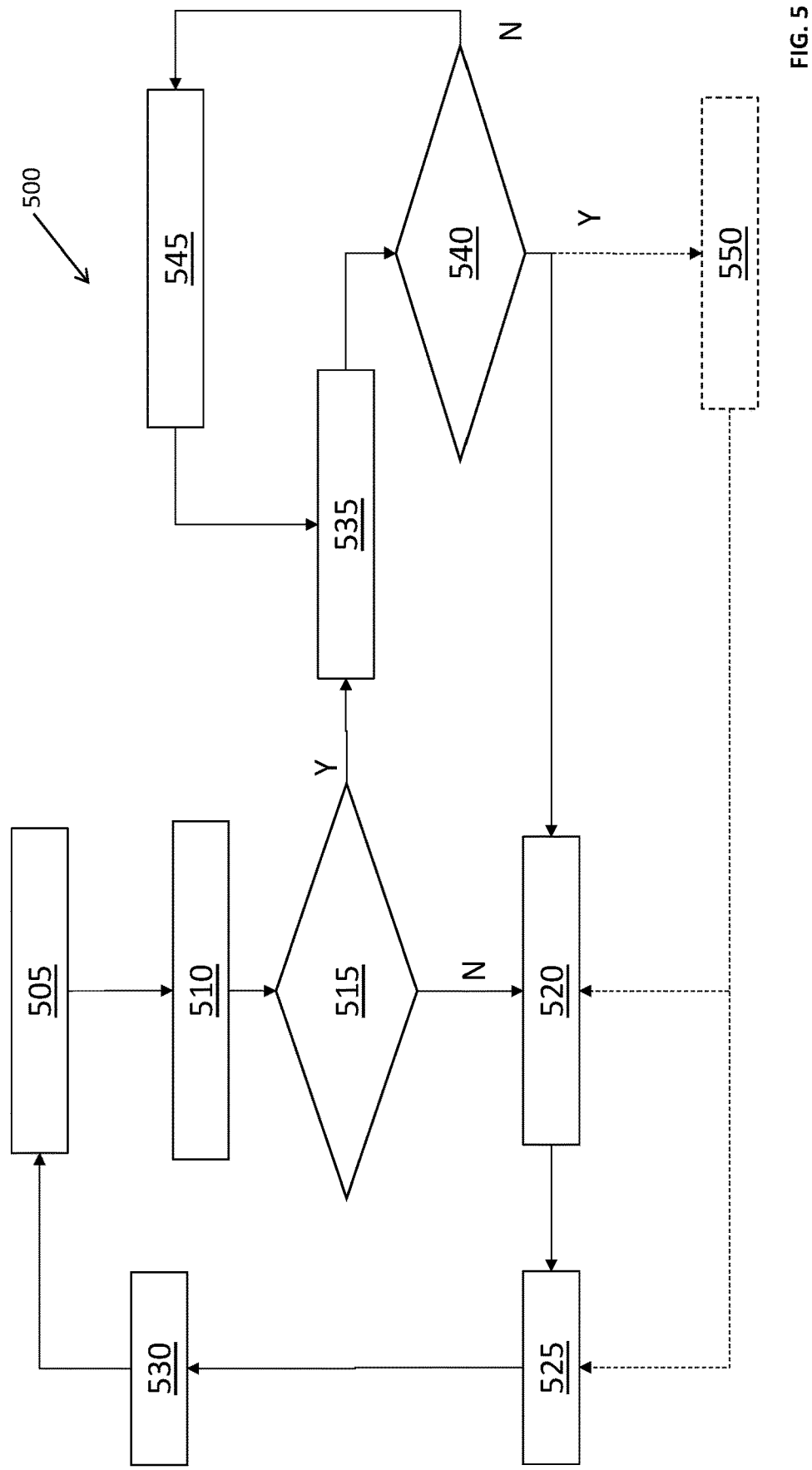
FIG. 5 shows a second flowchart illustrating a method of controlling the internal combustion engine in accordance with an embodiment of the present invention.

A second block diagram 500 representing operation of the controller 104 is shown in FIG. 5. The first request signal is received to initiate operation of the engine 101 in an overrun state (BLOCK 505). The first request signal comprises a fuel cut request. The controller 104 monitors the GPF particulate loading (BLOCK 510). It will be understood that monitoring of the GPF particulate loading may occur before receipt of the first request signal. A first check is performed to determine if the GPF particulate loading is greater than the first loading value (BLOCK 515). If the GPF particulate loading is less than the first loading value, the controller 104 closes the intake valves 301 and requests a fuel cut to implement the overrun state (BLOCK 520). In this condition there is no regeneration. The controller 104 maintains the intake valves 301 closed and maintains the fuel cut until receipt of a second request is received to terminate the overrun state (BLOCK 525). The controller 104 continues to operate (BLOCK 530). The process is repeated following receipt of another first request signal to operate the engine 101 in the overrun state.

If the check (BLOCK 515) determines that the GPF particulate loading is greater than the first loading value, the controller 104 is configured to implement a modified control strategy to implement the overrun state. The controller 104 requests a fuel cut to inhibit the supply of fuel to the engine 101. In this instance, since the GPF particulate loading is greater than the first loading value, the controller 104 is configured to open the intake valve 301 to implement the overrun state (BLOCK 535). The engine 101 operates in the overrun state with the fuel cut and the intake valves 301 open. Air is drawn into the combustion chambers 103A and the un-burnt air is pumped into the exhaust system 207. The air is oxygen rich and promotes regeneration of the GPF 214 whereby the trapped particulates (soot) are burnt. The intake valves may be opened during part or all of the intake stroke of each operating cycle to promote expulsion of the air into the exhaust system 207. A second check may be performed to determine if the GPF particulate loading is less than the second loading value (BLOCK 540). If the GPF particulate loading is greater than the second loading value, the controller 104 continues to monitor the GPF particulate loading (BLOCK 545); and maintains the intake valves 301 open and the fuel cut (BLOCK 535). If the GPF particulate loading is less than the second loading value, the controller 104 closes the intake valves 301 and requests a fuel cut to implement the overrun state (BLOCK 520). The controller 104 maintains the intake valves 301 closed and maintains the fuel cut until receipt of a second request to terminate the overrun state (BLOCK 525). The controller 104 continues to operate (BLOCK 530). Optionally, the second check (BLOCK 540) may comprise determining if the GPF particulate loading is less than the third loading value. If the GPF particulate loading is less than the third loading value, the controller 104 reinstates the supply of fuel to the engine 101 (BLOCK 550). The reinstatement of the supply of fuel may be appropriate to reduce or halt regeneration of the GPF 214. The controller 104 maintains the intake valves 301 closed and maintains the fuel cut (BLOCK 525). Alternatively, the controller 104 may terminate the overrun state (BLOCK 525).

An additional check may optionally be performed to determine if the temperature of the GPF 214 is sufficiently high to achieve regeneration. The check may comprise comparing a determined temperature of the GPF 214 to a predetermined temperature value for regeneration of the GPF 214. The temperature check may be performed before or after the first check to determine if the GPF particulate loading is greater than the first loading value (BLOCK 515). If the temperature of the GPF 214 is less than the predetermined temperature value, the controller 104 may maintain the intake valves 301 closed during the overrun state. If the temperature of the GPF 214 is greater than the predetermined temperature value, the controller 104 may open the intake valves 301 during the overrun state (BLOCK 535).

The control strategy implemented by the controller 104 in a first scenario will now be described by way of example with reference to a chart 600 shown in FIG. 6. The chart 600 comprises: a first trace 605 representing an overrun request status (a "0" indicating that overrun is not active, and a "1" indicating that overrun is active); a second trace 610 representing a GPF particulate load (including a first loading value SP1, a second loading value SP2 and a third loading value SP3); a third trace 615 representing an intake valve status (a "0" indicating that the intake valve is in a closed state to inhibit the supply of air; and a "1" indicating that the intake valve is in an open state); and a fourth trace 620 representing a fuel supply status (a "0" indicating a fuel cut to inhibit the supply of fuel; and a "1" indicating the supply of fuel).

The engine 101 is operating and the vehicle 100 is in motion. A first request signal is received at time t0 to operate the engine 101 in an overrun state. In dependence on the first request signal, the controller 104 implements the fuel cut at time to. The controller 104 determines that the GPF particulate loading is greater than the first loading value and maintains the intake valve 301 in the open state; and implements the fuel stop. By maintaining the intake valve 301 open, oxygen is supplied to the exhaust system 207 and into the GPF 214. The supply of oxygen enables regeneration of the GPF 214. The controller 104 monitors the GPF particulate load which decreases as regeneration is performed following the fuel cut. The regeneration continues until the controller 104 determines at time t1 that the GPF particulate load is less than the second loading value. In dependence on the determination that the GPF particulate load is less than or equal to the second loading value, the controller 104 closes the intake valve 301 at time t1 to reduce or halt regeneration. In a variant, the controller 104 may maintain the intake valve 301 open (illustrated by a modified third trace 615' comprising a broken line) and reinstate the supply of fuel (illustrated by a modified fourth trace 620' comprising a broken line) in dependence on the determination that the GPF particulate load is less than the second loading value.

The controller 104 continues to monitor the GPF particulate load. The oxygen present in the exhaust system 207 enables the regeneration to continue after the intake valves 307 are closed, albeit at a reduced rate (as represented by the change in gradient of the second trace 615 representing the GPF particulate loading). At time t2, the controller 104 determines that the GPF particulate load is at its lowest level (which remains greater than the third loading value in this scenario). The GPF particulate loading remains substantially constant for the time period t2 to t3. The second trace 615 has a gradient substantially equal to zero (0) in the time period t2 to t3 indicating that the GPF particulate loading is not changing. The controller 104 receives a second request signal at time t3 to terminate the overrun state. In dependence on the second request signal, the controller 104 opens the intake valve 301 and reinstates the supply of fuel to the engine 101. The process continues until receipt of a further first signal request. In the variant, the controller 104 may maintain the intake valve 301 open (illustrated by the modified third trace 615') and implement the fuel cut (illustrated by the modified fourth trace 620') in dependence on the determination that the GPF particulate load is at the minimum value or is less than or equal to the third loading value.

The control strategy implemented by the controller 104 in a second scenario will now be described by way of example with reference to a chart 700 shown in FIG. 7. The chart 700 comprises: a first trace 705 representing an overrun request status (a "0" indicating that overrun is not active, and a "1" indicating that overrun is active); a second trace 710 representing a GPF particulate load (including a first loading value SP1, a second loading value SP2 and a third loading value SP3); a third trace 715 representing an intake valve status (a "0" indicating that the intake valve is in a closed state to inhibit the supply of air; and a "1" indicating that the intake valve is in an open state); and a fourth trace 720 representing a fuel supply status (a "0" indicating a fuel cut to inhibit the supply of fuel; and a "1" indicating the supply of fuel).

The engine 101 is operating and the vehicle 100 is in motion. A first request signal is received at time t0 to operate the engine 101 in an overrun state. The controller 104 determines that the GPF particulate loading is greater than the first loading value at time to and maintains the intake valve 301 in the open state; and implements the fuel stop. By maintaining the intake valve 301 open, oxygen is supplied to the exhaust system 207 and into the GPF 214. The supply of oxygen enables regeneration of the GPF 214. The controller 104 monitors the GPF particulate load which decreases as regeneration is performed following the fuel cut. The regeneration continues until the controller 104 receives a second request signal at time t4 to terminate the overrun state. In dependence on the second request signal, the controller 104 opens the intake valve 301 and reinstates the supply of fuel to the engine 101. The regeneration of the GPF 214 ends following combustion being restarted.

The process continues until receipt of a further first signal request at time t5. The controller 104 determines that the GPF particulate loading is less than the first loading value at time t5 and closes the intake valve 301; and implements the fuel stop. The GPF particulate loading remains substantially constant for the time period t5 to t5. The second trace 715 has a gradient substantially equal to zero (0) in the time period t5 to t5 indicating that the GPF particulate loading is not changing. The controller 104 receives a second request signal at time t6 to terminate the overrun state. In dependence on the second request signal, the controller 104 opens the intake valve 301 and reinstates the supply of fuel to the engine 101. The process continues until receipt of a further first signal request.

It will be appreciated that various changes and modifications can be made to the present invention without departing from the scope of the present application.

For example, the controller 104 has been described herein as selectively opening and closing the intake valve 301 to control the intake of air during the fuel cut operating cycles. The controller 104 may be configured to control the timing of the valve opening and/or closing during an intake stroke to adjust the quantity of air drawn into the engine. For example, the controller 104 may retard opening of the intake valve 301 and/or advance closure of the intake valve 301 to reduce the quantity of air drawn into the engine. In a variant, the intake valve 301 could be variable lift valves. The controller 104 may be configured to control the lift of the or each intake valve 301. Thus, the quantity of gases drawn into the combustion chamber 103A during each intake stroke may be controlled.

| FIG. 2 LABELS | |
| --- | --- |
| 101 | INTERNAL COMBUSTION ENGINE |
| 102 | SECONDARY TORQUE SOURCE (OPTIONAL) |
| 104 | CONTROLLER |
| 105 | ACCELERATOR PEDAL SENSOR |
| 106 | STARTING SYSTEM |
| 202 | BRAKE SYSTEM |
| 203 | SENSING DEVICE |
| 204 | FUEL INJECTORS |
| 205 | IGNITION SYSTEM |
| 206 | VALVE ACTUATION MEANS (CVVL) |
| 209 | CATALYTIC CONVERTER |
| 210 | MEMORY DEICE |
| 212 | PROCESSOR |
| 213 | INPUT/OUTPUT MEANS |
| 214 | PARTICULATE FILTER |

| FIRST FLOW CHART 400 LABELS | |
| --- | --- |
| 401 | RECEIVE A FIRST REQUEST SIGNAL INDICATIVE OF A REQUEST TO CUT FUEL TO AN INTERNAL COMBUSTION ENGINE |
| 402 | CAUSE AN INTAKE VALVE OF A CYLINDER OF THE INTERNAL COMBUSTION ENGINE TO REMAIN CLOSED FOR THE CURRENT REVOLUTION OF THE INTERNAL COMBUSTION ENGINE AND REVOLUTION(S) OF THE INTERNAL COMBUSTION ENGINE IMMEDIATELY FOLLOWING THE CURRENT REVOLUTION OF THE INTERNAL COMBUSTION ENGINE IN DEPENDENCE ON THE INTAKE VALVE BEING CLOSED AT THE TIME OF RECEIVING THE FIRST REQUEST SIGNAL |
| 403 | CAUSE INJECTION OF FUEL INTO THE CYLINDER AND SUBSEQUENTLY CAUSE THE INTAKE VALVE TO REMAIN CLOSED FOR REVOLUTION(S) OF THE INTERNAL COMBUSTION ENGINE IMMEDIATELY FOLLOWING THE NEXT CLOSING OF THE INTAKE VALVE IN DEPENDENCE ON THE INTAKE VALVE BEING OPEN AT THE TIME OF RECEIVING THE FIRST REQUEST SIGNAL OR IF A NEXT OPENING OF THE INTAKE VALVE HAS ALREADY BEEN SCHEDULED AT THE TIME OF RECEIVING THE FIRST REQUEST SIGNAL AND SAID NEXT OPENING OF THE INTAKE VALVE IS TO BE PERFORMED |

| SECOND FLOW CHART 500 LABELS | |
| --- | --- |
| 505 | OVER-RUN WITH FUEL CUT REQUESTED |
| 510 | MONITOR GPF SOOT (PARTICULATE) LOAD |
| 515 | IS GPF LOAD > UPPER VALUE |
| 520 | USE INLET VALVE SHUT-OFF (IVSO) OVERRUN WITH FUEL CUT |
| 525 | OVER-RUN END |

-continued

| SECOND FLOW CHART 500 LABELS | |
|---|---|
| 530 | AWAIT NEXT REQUEST |
| 535 | USE INLET VALVE OPEN (IVO) OVER-RUN WITH FUEL CUT |
| 540 | IS GPF LOAD < LOWER VALUE |
| 545 | MONITOR GPF SOOT (PARTICULATE) LOAD |
| 550 | RE-INSTATE FUELLING (OPTIONAL) |

Figure 6:
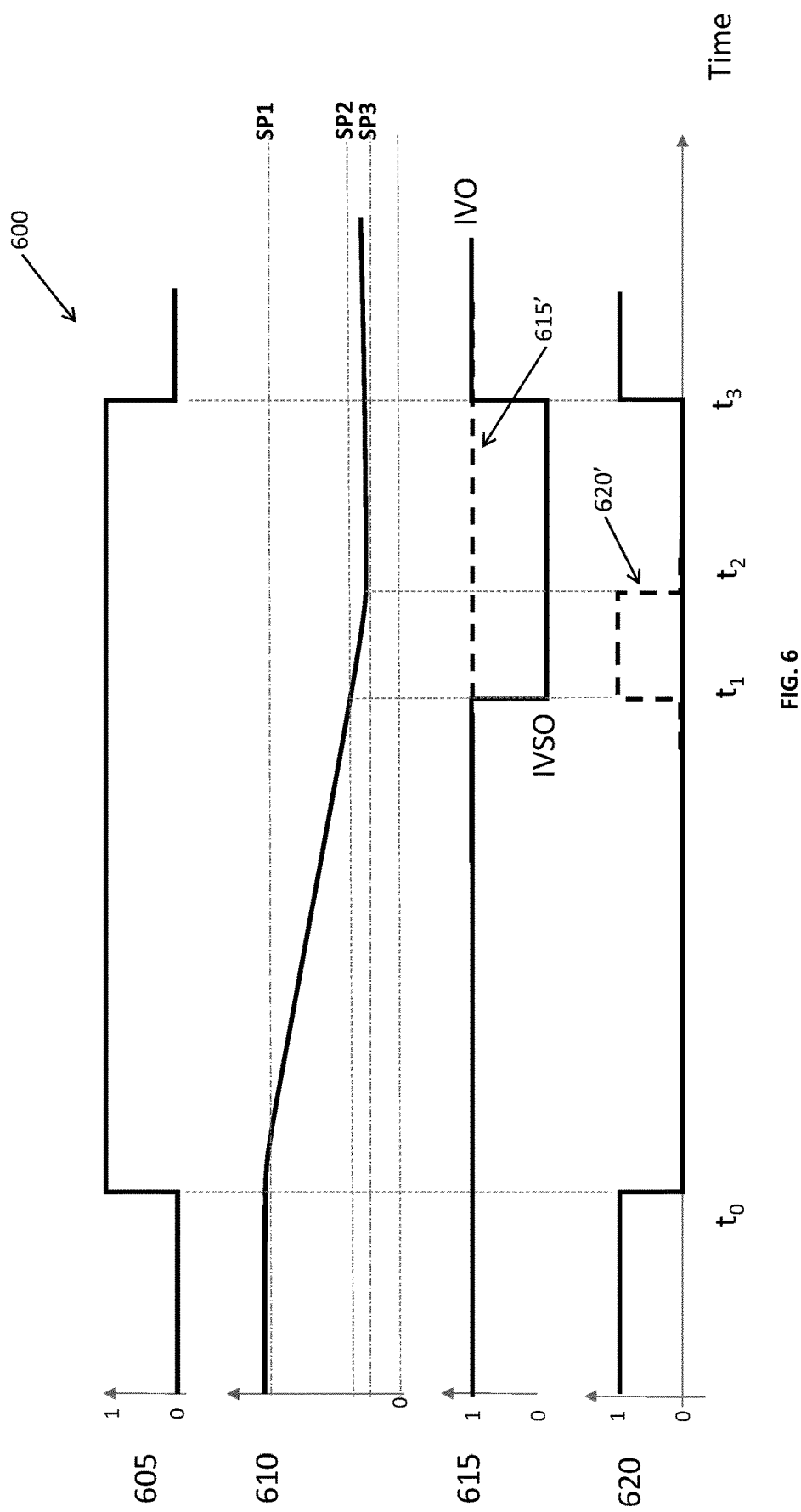
FIG. 6 shows a first chart illustrating operation of the internal combustion engine in a first scenario.

| FIG. 6 LABELS | |
|---|---|
| $t_0$ | OVERRUN REQUEST TRIGGERS FUEL-CUT. GPF LOAD > MAX THEN INLET VALVE OPEN (IVO) SO REGENERATION COMMENCES. |
| $t_1$ | LOW THRESHOLD OF SOOT LOADING TRIGGERS FUELLING TO BEGIN STOPPING REGENERATION. |
| $(t_2 - t_1)$ | TIME TAKEN TO STOP REGENERATION (TIME ELAPSED, OR CALCULATED, OR SENSED VIA HEGO OR OTHER OXYGEN SENSOR). |
| $t_2$ | INLET VALVE SHUT-OFF (IVSO) AND FUEL-CUT IF OVER-RUN IS CONTINUING. SOOT (PARTICULATE) LOAD IS AT 'MINIMUM'. |
| $t_3$ | PARTICULATES (SOOT) STARTS TO ACCUMULATE IF NO MORE OVERRUN. |

Figure 7:
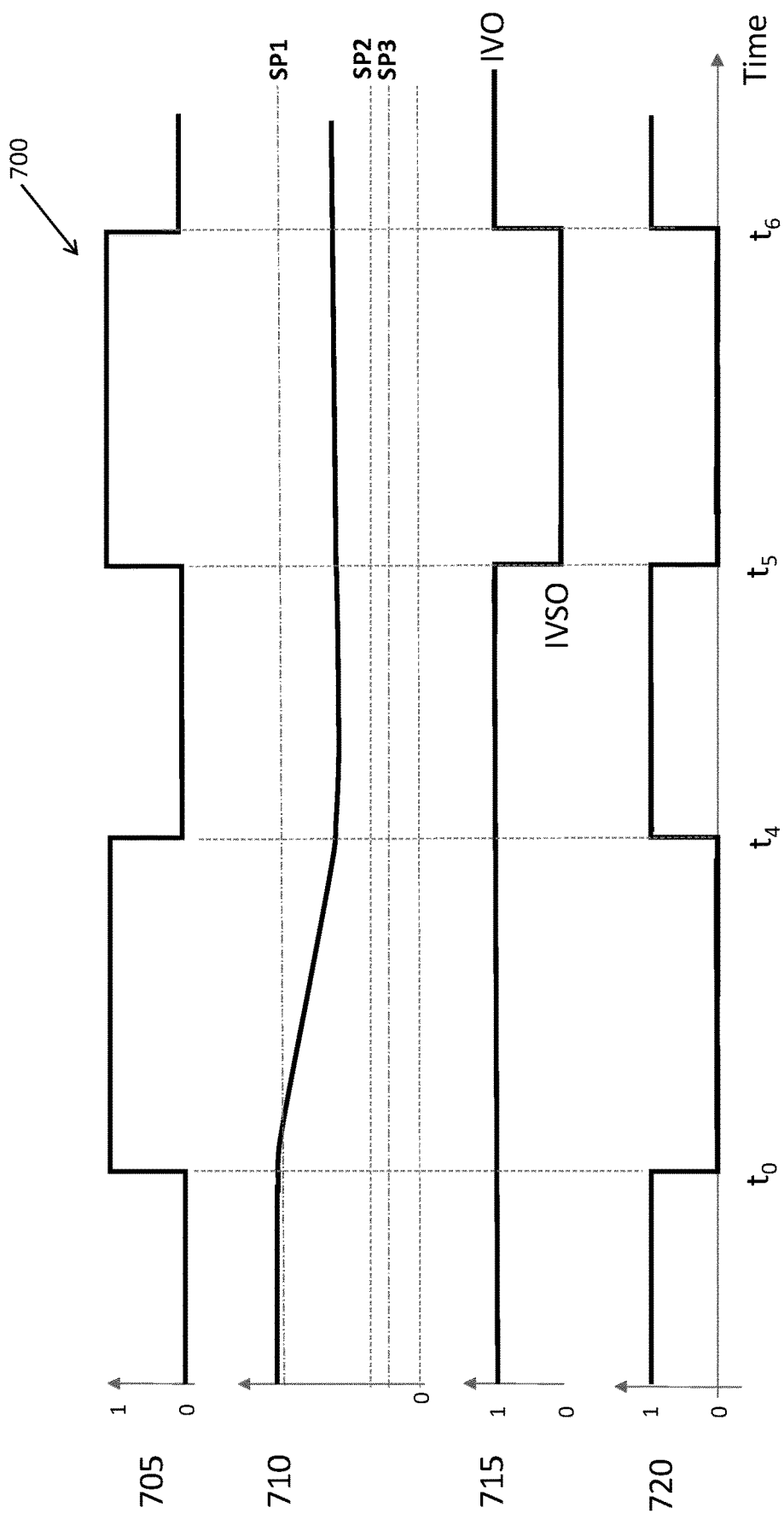
FIG. 7 shows a second chart illustrating operation of the internal combustion engine in a second scenario.

| FIG. 7 LABELS | |
|---|---|
| $t_0$ | OVER-RUN REQUEST TRIGGERS FUEL-CUT. GPF LOAD > MAX THEN INLET VALVE OPEN (IVO) SO REGENERATION COMMENCES. |
| $t_4$ | OVER-RUN REQUEST CEASES. |
| $t_5$ | NEXT OVER-RUN WITH GPF LOAD < MAX SO INLET VALVE SHUT-OFF (IVSO) + FUEL CUT. |
| $t_6$ | OVER-RUN REQUEST CEASES |

The invention claimed is:

1. A controller for controlling operation of a direct injection internal combustion engine having a combustion chamber for performing a plurality of operating cycles, the internal combustion engine being configured to exhaust gases through an exhaust system comprising a particulate filter, the controller being configured to:
   receive a fuel cut signal indicative of a request to inhibit fuel injection into the combustion chamber;
   in dependence on the fuel cut signal, control a fuel supply system to inhibit fuel injection into the combustion chamber to perform one or more fuel cut operating cycle;
   determine a particulate loading of the particulate filter in the exhaust system; and
   compare the determined particulate loading to a predetermined first loading value;
   wherein, during the one or more fuel cut operating cycle, the controller is configured to close an intake valve while the engine is rotated through two or more revolutions to inhibit the introduction of intake gases into the combustion chamber during the one or more fuel cut operating cycle if the comparison determines that the determined particulate loading of the particulate filter is less than the predetermined first loading value.

2. The controller as claimed in claim 1, comprising an electronic processor having an electrical input for receiving said fuel cut signal; and
   an electronic memory device electrically coupled to the electronic processor and having instructions stored therein,
   the processor being configured to access the memory device and execute the instructions stored therein such that it is operable to:
   control the fuel supply system to inhibit fuel injection into the combustion chamber to perform the one or more fuel cut operating cycle;
   determine the particulate loading of the particulate filter in the exhaust system; and
   control operation of the intake valve to control the introduction of intake gases into the combustion chamber in dependence on the determined particulate loading of the particulate filter.

3. The controller as claimed in claim 1, wherein the controller is configured, during the one or more fuel cut operating cycle, to open the intake valve to enable the introduction of intake gases into the combustion chamber if the comparison identifies that the determined particulate loading is greater than the predetermined first loading value.

4. The controller as claimed in claim 1, wherein the controller is configured to model the particulate loading of the particulate filter in dependence on one or more operating parameter of the internal combustion engine.

5. The controller as claimed in claim 1, wherein the controller is configured to determine the particulate loading of the particulate filter in dependence on at least one sensor signal.

6. The controller as claimed in claim 1, wherein the controller is configured to control operation of the intake valve to control the introduction of intake gases into the combustion chamber to maintain a target particulate loading of the particulate filter, the target particulate loading corresponding to the particulate filter being part-loaded.

7. The controller as claimed in claim 6, wherein the target particulate loading is between the predetermined first loading value and a predetermined second loading value.

8. The controller as claimed in claim 1, wherein the controller is configured to compare the determined particulate loading to a predetermined second loading value.

9. The controller as claimed in claim 8, wherein the controller is configured to:
monitor the particulate loading of the particulate filter during the one or more fuel cut operating cycle; and
close the intake valve to inhibit the introduction of intake gases into the combustion chamber during the one or more fuel cut operating cycle if the determined particulate loading decreases to less than the predetermined second loading value.

10. The controller as claimed in claim 8, wherein the controller is configured to:
monitor the particulate loading of the particulate filter during the one or more fuel cut operating cycle; and
control the fuel supply system to reinstate fuel injection into the combustion chamber during the one or more fuel cut operating cycle if the determined particulate loading decreases to less than the predetermined second loading value.

11. The controller as claimed in claim 8, wherein the controller is configured to:
monitor the particulate loading of the particulate filter during the one or more fuel cut operating cycle; and
open the intake valve to enable the introduction of intake gases into the combustion chamber if the comparison identifies that the determined particulate loading is greater than the predetermined second loading value.

12. A vehicle comprising a controller as claimed in claim 1.

13. A method for controlling operation of a direct injection internal combustion engine having a combustion chamber for performing a plurality of operating cycles, the internal combustion engine being configured to exhaust gases through an exhaust system comprising a particulate filter, the method comprising:
receiving a request to inhibit fuel injection into the combustion chamber;
in dependence on the request, inhibiting fuel injection to perform one or more fuel cut operating cycle; and
determining a particulate loading of the particulate filter in the exhaust system;
comparing the determined particulate loading to a predetermined first loading value; and
during the one or more fuel cut operating cycle and while the engine is rotated through two or more revolutions, inhibiting the introduction of intake gases into the combustion chamber if the comparison determines that the determined particulate loading of the particulate filter is less than the predetermined first loading value.

14. The method as claimed in claim 13, comprising introducing intake gases into the combustion chamber during the one or more fuel cut operating cycle if the comparison identifies that the determined particulate loading is greater than the predetermined first loading value.

15. The method as claimed in claim 13 comprising comparing the determined particulate loading to a predetermined second loading value.

16. A non-transitory computer readable medium comprising computer readable instructions that, when executed by a processor, cause performance of the method according to claim 13.

* * * * *